United States Patent [19]

Matsuura et al.

[11] 4,118,745
[45] Oct. 3, 1978

[54] SINGLE LEVER OPERATED CASSETTE TAPE RECORDER

[75] Inventors: Haruo Matsuura, Shimizu; Kiyoshi Kawahara, Shizuoka, both of Japan

[73] Assignee: Star Seimitsu Kabushiki Kaisha, Japan

[21] Appl. No.: 787,963

[22] Filed: Apr. 15, 1977

[30] Foreign Application Priority Data

Apr. 17, 1976 [JP] Japan .................. 51-47358[U]

[51] Int. Cl.² ............... G11B 15/02; G11B 15/18
[52] U.S. Cl. ................................ 360/96; 360/62; 360/71
[58] Field of Search ............. 360/96, 93, 71, 73, 360/62, 137, 74; 242/199–202; 200/61.58

[56] References Cited

U.S. PATENT DOCUMENTS

| 3,581,022 | 5/1971 | Sagamihara et al. | 360/60 |
|---|---|---|---|
| 3,822,372 | 7/1974 | Coenen et al. | 200/61.58 |
| 3,877,074 | 4/1975 | Guttinger | 360/62 |
| 3,921,214 | 11/1975 | Nyffenegger | 360/62 |
| 3,932,892 | 1/1976 | Saito | 360/96 |

Primary Examiner—Alfred H. Eddleman
Attorney, Agent, or Firm—Robert E. Burns; Emmanuel J. Lobato; Bruce L. Adams

[57] ABSTRACT

A cassette tape recorder is provided in which a stop, a record, a playback and a rewind mode can be established by using a single operation lever. The lever is supported for angular movement about a pivot on a baseplate which is secured within an enclosure, and includes a knob which projects outwardly of the enclosure. The lever can be sequentially brought into positions corresponding to the various modes by operating the knob. The lever is provided with a notch cam, which is engaged by a pin on a control lever which is supported on the baseplate above the operation lever for angular movement about a pivot. A rotary shaft is rotatably mounted in the control lever and carries a pulley driven by an electric motor on one end and a relay wheel on the other end. A take-up shaft and a rewind shaft are rotatably mounted in the baseplate and have their one end extending into a cassette receiving housing while their other end project to the opposite side of the baseplate from the housing and carries a take-up wheel and a rewind wheel, respectively. The rewind wheel is maintained in operative connection with an idler rotatably mounted on the baseplate. The control lever is spring biased in a direction to urge the relay wheel thereon into operative connection with the take-up wheel, and the notch cam controls the movement of the control lever.

9 Claims, 11 Drawing Figures

SINGLE LEVER OPERATED CASSETTE TAPE RECORDER

FIELD AND BACKGROUND OF THE INVENTION

The invention relates to a cassette tape recorder, and more particularly, to a small size tape recorder having a single lever to provide a switching between stop, record, playback and rewind modes.

A tape recorder operated with a single lever is frequently manufactured as a pocket size or handy size recorder which is adapted to receive a miniature tape cassette, sometimes called as "Dictaphone type," measuring 56 mm in lateral depth, 33 mm in depth and 7.5 mm in thickness. Because such recorder is held by one hand and its lever operated with the thumb of the hand in use, it is essential that it has a reduced overall weight and provides a smooth lever operation. In the conventional construction of recorders of this type, the single operation lever has associated therewith a number of auxiliary levers and/or links which control a tape drive unit, the positioning of a main head and an erase head and switches including record/playback changeover switch, and this resulted in a drag presented in shifting the operation lever. In addition, the increased number of parts required resulted in an increased cost in the manufacture and assembly and also added to the weight of the recorder.

SUMMARY OF THE INVENTION

It is an object of the invention to provide a cassette tape recorder which is simple in construction and manufactured inexpensively.

It is another object of the invention to provide a single lever operated tape recorder which can be held by one hand and which assures a smooth switching between different operational modes.

It is a further object of the invention to provide a single lever operated cassette tape recorder of a small size and a reduced weight which is suitable for use with a miniature tape cassette of the size mentioned above. A single lever operated tape recorder of the invention comprises an operation lever of a relative large, flat semi-circular form which is supported for angular movement about a pivot on a baseplate which is fixedly mounted within an enclosure. The operation lever has an extension from its periphery at a position away from the pivot, which extension projects externally of the enclosure and carries a knob. The knob may be manually operated to bring the operation lever into predetermined positions corresponding to stop, record, playback and rewind modes. The operation lever is provided with a notch cam, which is engaged by a pin on a control lever which is also supported on the baseplate for angular movement about a pivot. A rotary shaft is rotatably mounted on the free end of the control lever, and carries a motor driven pulley on one end and a relay pulley on the other end. A take-up shaft and a rewind shaft are rotatably mounted in the baseplate and have their one end extending into a cassette receiving housing and carry a take-up wheel and a rewind wheel, respectively, on their other end. The rewind wheel is maintained in operative connection with an idler having its shaft mounted on the baseplate.

The control lever assumes one of three positions when the operation lever is shifted to a position corresponding to a particular mode. Specifically, when the operation lever assumes a record or playback position, the control lever assumes a first operational position in which the rotary shaft carried thereby is operatively connected with the take-up wheel. When the operation lever is in its rewind position, the control lever assumes a second operational position in which the relay wheel on the rotary shaft is operatively connected with the idler. In the stop position of the operation lever, the control lever assumes a neutral position in which neither the rotary shaft is connected with the take-up wheel nor the relay wheel is connected with the idler. To achieve such relationship between the operation and control levers, the free end of the control lever is engaged by a spring, which urges it into the first operational position. The notch cam on the operation lever which engages the pin extending from the control lever is configured and profiled to cooperate with the spring to bring the control lever selectively into the first, second or neutral position.

In this manner, the take-up and the rewind shaft extending into the cassette receiving housing can be positioned in a manner corresponding to any selected one of stop, record, playback and rewind modes in response to a movement of the single operation lever. In contradistinction to a known cassette tape recorder wherein a main head and an erase head are mounted on a carrier plate which is movable in a direction perpendicular to the tape length across the reals or hubs, the main or transducer head is fixedly mounted within the housing while the erase head is supported for angular movement about a pivot secured to the housing so that it may be located in one of predetermined operative, inoperative and neutral positions in connection with the movement of the operation lever.

In the tape recorder of the invention, the operation lever also controls various switches in response to the selection of a particular mode. These switches include a power switch which is turned on except in the stop mode, and a record switch which is turned off except in the record mode. At this end, the operation lever carries cams or projections which directly drive the armature of switches.

DESCRIPTION OF PREFERRED EMBODIMENT

Figure 1:
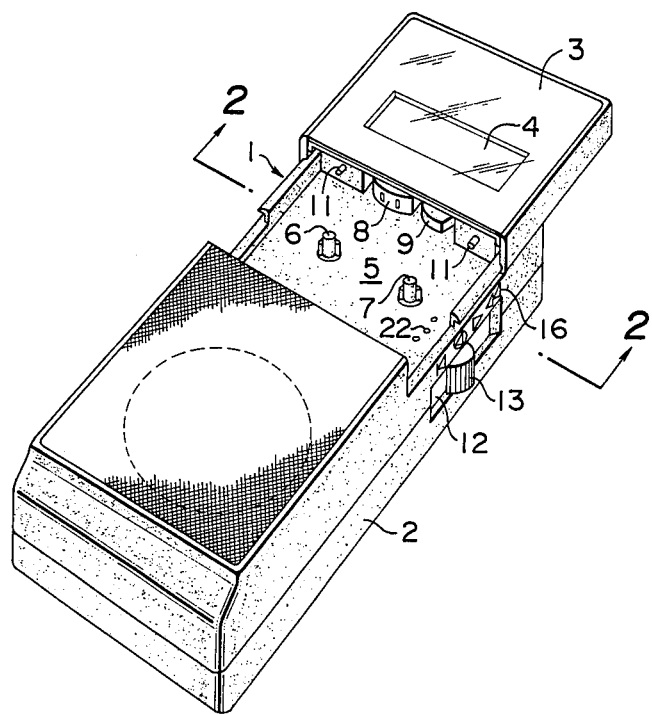
FIG. 1 is a perspective view of the single lever operated tape recorder of the invention.

Referring to FIG. 1, the single lever operated tape recorder of the invention is shown as including a housing 1 which receives a tape cassette in a replaceable manner. While the recorder shown may preferably be used with a miniature tape cassette of so-called "Dictaphone type" which measures 56 mm in lateral width, 33 mm in depth and 7.5 mm in thickness, it is also adapted to be used with a tape cassette of so-called "Philips type" which measures 100 mm in lateral width, 64 mm in depth and 8 mm in thickness.

An enclosure of the recorder is shown at 2, and the housing 1 includes a cover 3 which is slidably mounted on and adjacent to the front end of the enclosure 2. The cover 3 is formed with a window 4 which permits a monitoring of a cassette tape loaded into the housing 1. The bottom of the housing 1 is covered by a baseplate 5 which is fixedly mounted within the enclosure 2. A take-up shaft 6 and a rewind shaft 7 are rotatably mounted in the baseplate 5 and extend into the housing 1 so that they engage a take-up and a rewind reel, respectively, of a tape cassette as the latter is loaded into the housing 1. A transducer head 8 is fixedly mounted on the baseplate 5 at a position which is exactly located to cause it to contact a tape running across the reels of the cassette when the latter is loaded. An erase head 9 is located adjacent to the transducer head 8 and is mounted on a pivot 10 (see FIGS. 7 to 10) for angular movement, the pivot 10 being fixedly mounted on the baseplate 5. The operation of the erase head 9 will be described in detail later. A pair of cassette stops 11 are disposed in alignment with the heads 8, 9 in order to prevent an excessive pressure from being exerted upon the tape surface by the heads 8, 9 as the cassette is loaded.

In one side, the enclosure 2 is formed with an opening 12 through which extends a knob 13 that is attached to an extension 14 (see FIG. 3) of an operation lever 15 which is pivotally mounted within the enclosure 2. Along the upper edge of the opening 12, there are provided marks 16 which indicate record, stop, playback and rewind operations, respectively, in the sequence named from left to right, and the knob 13 is moved manually to a position directly below one of these marks 16, the operation lever 15 is effective to establish a corresponding mode of operation.

Figure 2:
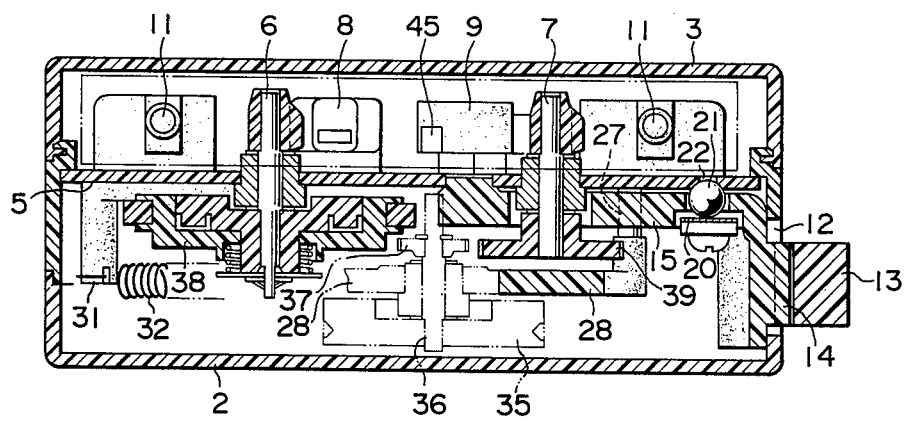
FIG. 2 is an enlarged cross section taken along the line 2—2 shown in FIG. 1.
Figure 3:
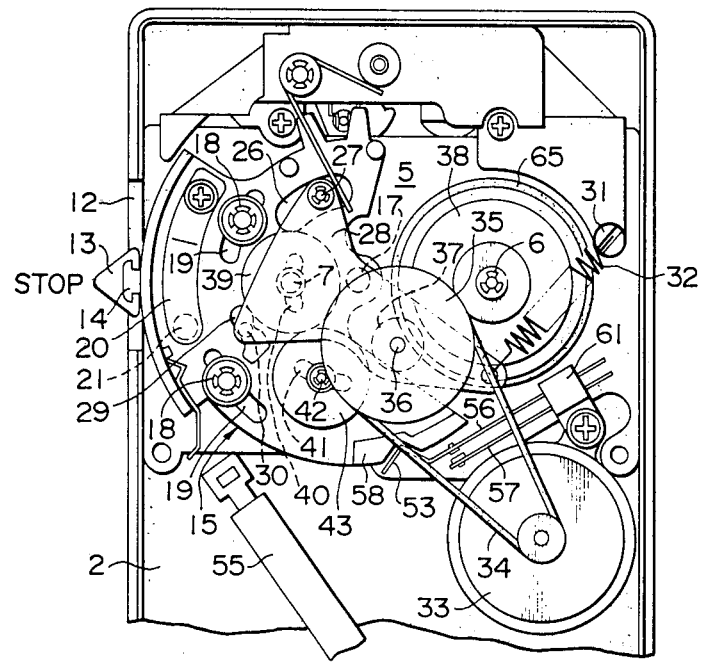
FIGS. 3, 4, 5 and 6 are plan views, as viewed from the backside or underside of the baseplate, showing the position of various parts of the recorder shown in FIG. 1 in stop, record, playback and rewind mode, respectively.
Figure 4:
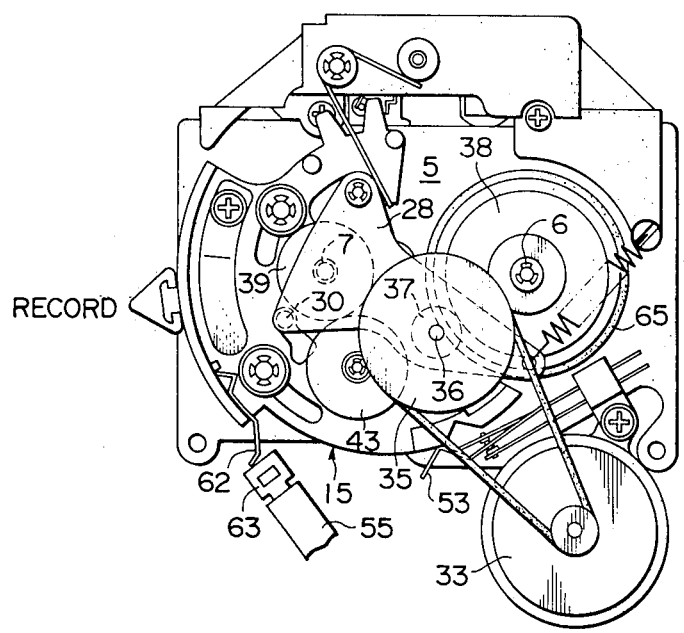
Figure 5:
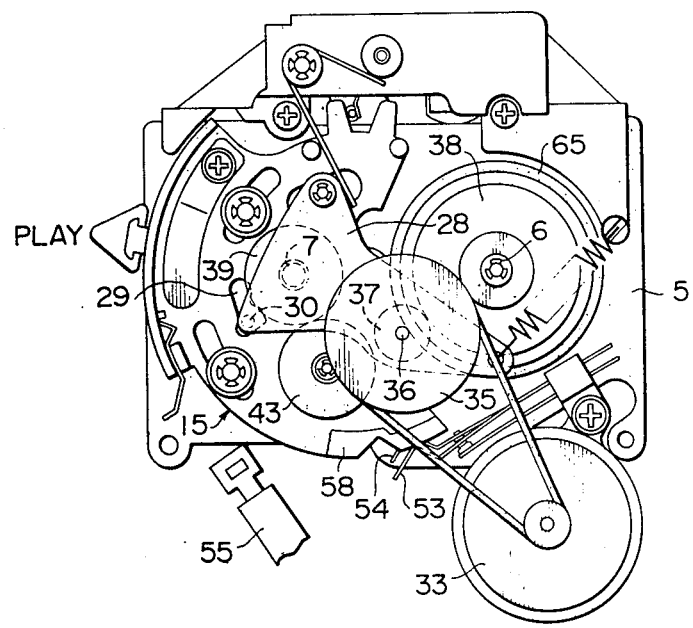
Figure 6:
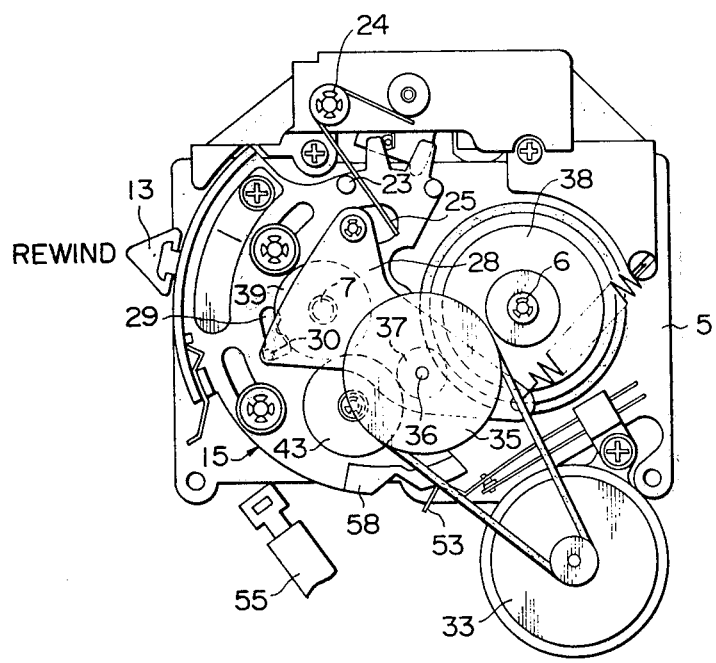
Figure 7:
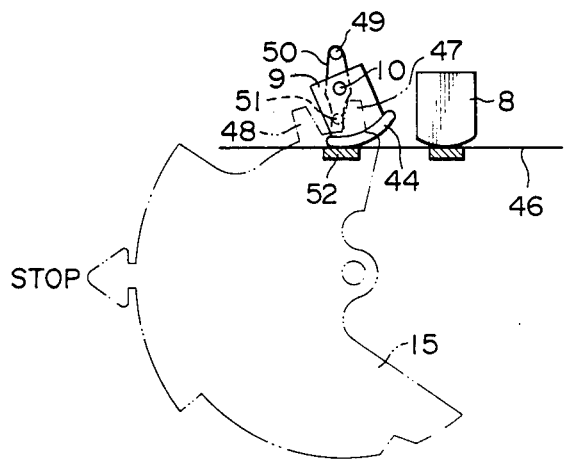
FIGS. 7, 8, 9 and 10 are plan views illustrating the manner of operation of the erase head in each of the modes shown in FIGS. 3 to 6.
Figure 8:
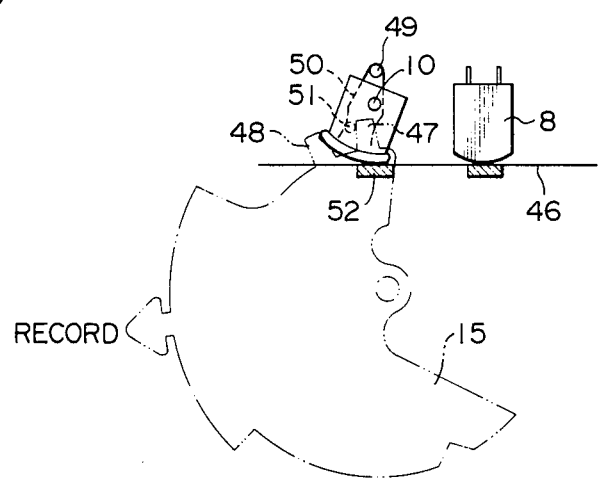
Figure 9:
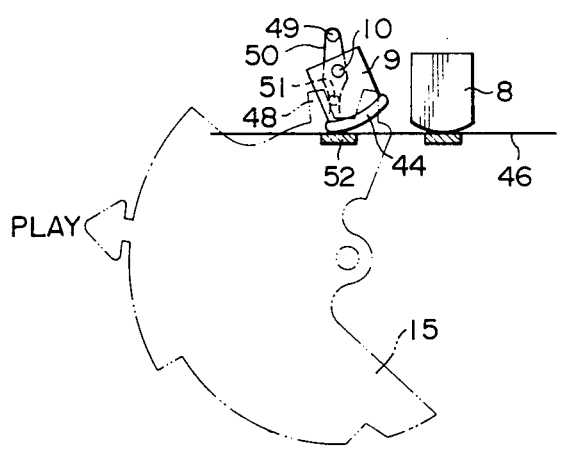
Figure 10:
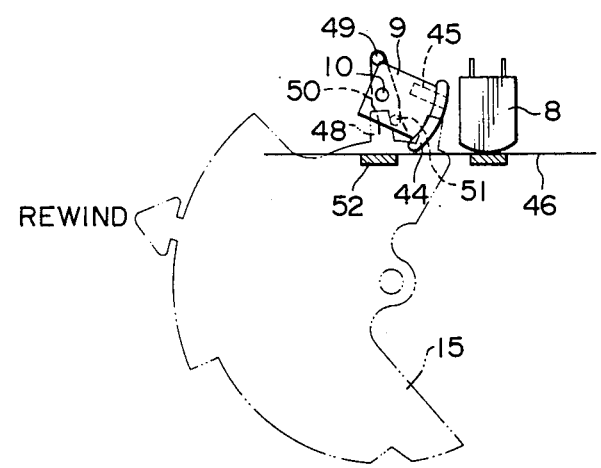

The operating lever 15 is shown in detail in FIGS. 2 and 3, and it will be seen from these Figures that it comprises a plate of a relative large, flat semi-circular form which is molded from a synthetic resin material and which is mounted on the underside of the baseplate 5, that is, on the opposite side thereof from the housing 1, for angular movement about a pivot 17. A pair of headed guide pins 18 are fixedly mounted on the underside of the baseplate 5 for engagement with a pair of arcuate guide slots 19 formed in the operation lever 15 in order to support it on the baseplate 5 in a movable manner and free from rattling and to limit the extent of movement thereof. In the description to follow, it is to be noted that unless otherwise specified, parts mentioned in connection with FIGS. 3 to 6 are mounted on or located below the baseplate 5 since these Figures represent bottom views. The operating lever 15 is adapted to move to any of record, stop, playback and rewind positions in a smooth manner as the knob 13 is operated. Except for rewind mode, the operation lever 15 is locked in a selected position by a metal ball 21 recessed in the lever 15 and resiliently urged by a click-stop leaf spring 20, mounted on the lever 15, into engagement with openings 22 (see FIGS. 1 and 2) formed in the baseplate 5 at preselected positions. In the rewind mode, a post 23 (see FIG. 6) moves into abutment against a wire spring 25 having its one end secured to a pin 24 on the baseplate 5, and the lever 15 cannot be held in such position unless the knob 13 is manually held in the rewind position. As the knob 13 is released, the operation lever 15 automatically returns to the playback position which is next to the rewind position. This arrangement is particularly useful in a small size tape recorder where rewind and playback operations are frequently repeated.

The operation lever 15 is also formed with an arcuate slot 26 through which extends a pivot 27 secured to the baseplate 5, and a control lever 28 is mounted on the free end of the pivot 27 for angular movement thereabout. The control lever 28 comprises a generally triangular, flat plate molded from a synthetic resin material, and has one of its apices pivotally connected with the pivot 17. At one of its remaining apices, the control lever 28 has a pin 30 extending toward the operation lever 15 and engaging a notch cam 29 on the latter. The last apex of the control lever 28 is connected with one end of a coiled spring 32, the other end of which is anchored to a stationary post 31 on the baseplate 5. An electric motor 33 is fixedly mounted on the baseplate 5 and has its output shaft connected through a belt 34 with a pulley 35 that is carried by one end of a rotary shaft 36, which is in turn rotatably mounted in the control lever 28. A relay wheel 37 is carried by the opposite end of the rotary shaft 36.

On the opposite end from the end which projects into the housing 1, the take-up and the rewind shaft 6, 7 carry a take-up and a rewind wheel 38, 39, respectively. The opposite end of the rewind shaft 7 extends through an arcuate slot 40 (see FIG. 3) in the operation lever 15, and the rewind wheel 39 is located between the operation lever 15 and the control lever 28. The rewind wheel 39 is operatively connected with an idler 43 that is mounted on a shaft 42 extending from the baseplate 5 and through an arcuate slot 41 (see FIG. 3) formed in the operation lever 15.

When the operation lever 15 is moved to a selected position corresponding to a particular mode of operation, the notch cam 29 thereon cooperates with the spring 32 in moving the control lever 28 through the pin 30 which engages the cam. When the operation lever 15 is in its record or playback position (FIGS. 4 and 5), the control lever 28 assumes a first operational position in which the rotary shaft 36 carried thereby is operatively connected or associated with a rubber lining 65 disposed around the periphery of the take-up wheel 38. As a result, the motor 33 drives the take-up shaft 6 in a given direction through the rotary shaft 36 and the take-up wheel 38. When the operation lever 15 is in its rewind position (FIG. 6), the control lever 28 assumes a second operational position in which the relay wheel 37 thereon is operatively connected with the idler 43, whereby the motor 33 drives the rewind shaft 7 in the opposite direction through the pulley 35, rotary shaft 36, relay wheel 37, idler 43 and rewind wheel 39. In the stop position of the operation lever 15 (see FIG. 3), the control lever 28 assumes a neutral position in which neither the rotary shaft 36 is connected with the take-up wheel 38 nor the relay wheel 37 is connected with the idler 43. Thus in this position, neither take-up nor rewind shaft 6, 7 rotates.

As mentioned above, the erase head 9 of this tape recorder is angularly movable about the pivot 10, and is moved as the operation lever 15 is operated. Referring to FIGS. 7 to 10, the erase head 9 has a curved front face 44 formed by an insulating material, and includes a magnet 45 (see FIGS. 2 and 10) which has its one end exposed through the insulating material at an offset position of the front face 44. In the stop and playback positions of the operation lever 15, the head 9 assumes a neutral position shown in FIGS. 7 and 9 in which a portion of the front face 44 remote from the magnet 45 bears against a tape 46. In the record position of the operation lever 15, the head 9 assumes an operative position shown in FIG. 8 in which the end face of the magnet 45 bears against the tape 46. In the rewind position of the operation lever 15, the head 9 assumes an inoperative position in which the front face 44 inclusive of the magnet 45 is removed from the tape 46.

To achieve such operation of the erase head 9, it is provided with a pin 51 which is adapted to selectively engage a pair of arms 47, 48 extending from the operation lever 15 and which is resiliently urged by a forked spring 50 mounted on a post 49 which is fixedly mounted on top of the baseplate 5. The spring 50 urges the head 9 into its neutral position which it assumes during the stop and playback modes. The arm 47 moves the head 9 to and maintains it in its operative position shown in FIG. 8 against the bias of the spring 50 in the record position of the operation lever 15, while the arm 48 moves the head 9, against the resilience of the spring 50, to its inoperative position shown in FIG. 10 which is oppositely located from the operative position with respect to the neutral position as the operation lever 15 is moved to its rewind position. In the playback position, the insulating front face 44 of the head 9 which is remote from the magnet bears against the tape 46, thus holding the tape 46 against a tape pad 52 located within the cassette to prevent an oscillation of the tape as it runs. In the rewind position, the head 9 is completely clear from the tape, thus unloading it during the rewind.

Figure 11:
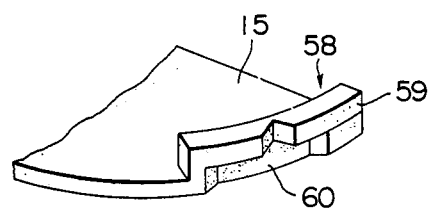
FIG. 11 is a perspective view of a switch controlling cam on the operating lever.

Referring back to FIGS. 3 to 6, there are shown three switches 53, 54 and 55 which are actuated as the operation lever 15 is moved. Each of the switches 53, 54 comprises a pair of movable and stationary leaves 56, 57 (FIG. 3) supported by a block 61 secured to the baseplate 5. The leaves of the switch 54 are disposed in vertical alignment with the corresponding leaves of the switch 53 and hence are invisible in FIG. 3. The movable leaves of the switches 53, 54 engage cam surfaces 59, 60 (FIG. 11), respectively, of a cam 58 formed around part of the periphery of the operation lever 15. The upper switch 53 represents a power switch, which is therefore turned on except when the recorder is in the stop mode. The lower switch 54 is arranged to be turned on only during the rewind mode to eliminate any unnecessary sound reproduction. The remaining switch 55 is shown as a piston operated switch, which is turned on during the record mode by a spring member 62 extending from the periphery of the operation lever 15 and which operates on a piston armature 63.

In the tape recorder thus constructed, the knob 13 is capable of assuming a record, a stop, a playback and a rewind position in the sequence named. Thus it is possible to switch from the stop mode to either record or playback mode directly. When switching from the stop to the rewind mode, it will be noted that the recorder must once pass through the playback mode before the rewind mode can be established. However, in the arrangement of the invention, there is a certain time lag between the release of the operative connection between the rotary shaft 36 and the take-up wheel 38 and the initiation of the operative connection between the relay wheel 37 and the idler, which time lag is sufficient to prevent undue stresses which might give rise to a breakage in or a deformation of the tape from being applied to the tape simultaneously. This arrangement is rather advantageous where the playback mode and the rewind mode are frequently repeated as may be experienced during a transcribing of a recorded message, since the release of the knob 13 from the rewind position automatically re-establishes the playback mode, by the action of the spring 25 (see FIG. 6).

While the invention has been described in detail with reference to a particular embodiment, it should be understood that a variety of changes and modifications are possible therein. By way of example, the rewind wheel, idler and relay wheel have been shown as friction wheels for simplicity of illustration. However, they may be replaced by toothed wheels, which may be more desirable in certain circumstances. The embodiment disclosed does not incorporate a rapid advance mode, which however can be implemented by providing a pushbutton which is unlocked by the operation lever during the rewind mode and which actuates a switch which is connected to supply a higher voltage to the motor. Therefore, it should be understood that the disclosure is illustrative only, and not limitative of the invention.

Having described the invention, what is claimed is:

1. A cassette tape recorder comprising an enclosure including a tape cassette receiving housing, a baseplate fixedly mounted within the enclosure, a takeup shaft and a rewind shaft rotatably mounted in the baseplate and each having one end projecting into the housing, an operation lever pivotally supported on the baseplate for angular movement and carrying a knob which projects externally of the enclosure and which may be manually operated to position the operation lever to one of predetermined record, stop, playback and rewind positions, a control lever pivotally mounted on the baseplate, a drive source, a relay wheel rotatably mounted on the control lever and including a rotary shaft connected with the drive source, and means for controlling the control lever in a manner such that when the operation lever is in either record or playback position, the control lever is moved to a first operational position in which the rotary shaft is effective to drive the take-up shaft in a given direction, when the operation lever is in its rewind position, the control lever is moved to a second operational position in which the relay is effective to drive the rewind shaft in the opposite direction from the given direction, and when the operation lever is in its stop position, the control lever assumes a neutral position in which neither the rotary shaft nor the relay wheel is effective to drive the take-up and the rewind shaft, respectively, said means for controlling the control lever comprising a notch cam formed on the operation lever, a pin on the control lever engaging the notch cam, and a spring normally urging the control lever in a direction to cause the relay wheel to be operatively connected with the take-up shaft, the notch cam cooperating with the spring to control the position of the control lever through the pin.

2. A cassette tape recorder according to claim 1 in which the operation lever is sequentially movable through the record, stop, playback and rewind positions in the sequence named, and further including lock means for releaseably locking the operation lever in each of the record, stop and playback positions, and spring means for urging the operation lever to the playback position when it is moved to the rewind position, whereby in the rewind position of the operation lever, it is automatically returned to the playback position by the action of the spring means unless the knob is manually held in the rewind position.

3. A cassette tape recorder according to claim 1, wherein another end of each of the take-up and rewind shafts extends to the opposite side of the baseplate from the housing, and further including a take-up wheel secured to said another end of the take-up shaft, a rewind wheel secured to the other end of the rewind shaft, and an idler rotatably mounted on the baseplate and maintained in operative connection with the rewind wheel, the rotary shaft being operatively connected with the take-up wheel in the first operational position of the control lever, the relay wheel being operatively connected with the idler in the second operational position of the control lever, the rotary shaft and the relay wheel being located intermediate the take-up wheel and the idler in the neutral position of the control lever.

4. A cassette tape recorder according to claim 1, further including a switch having a movable contact disposed adjacent to the operation lever, and a member on the operation lever for driving the movable contact.

5. A single lever operated cassette tape recorder in which all of a record, a stop, a playback and a record mode can be established by an operation of a single operation lever, comprising an enclosure including a tape cassette receiving housing, a take-up shaft and a rewind shaft each having one end projecting into the housing so that they are engaged by a take-up reel and a rewind reel of a tape cassette as the latter is received into the housing, a transducer head and an erase head disposed for contact with the tape of a cassette that is received into the housing, a baseplate fixedly mounted within the enclosure, an operation lever supported on the baseplate for angular movement and carrying a knob which projects externally of the enclosure and which can be manually operated to position the operation lever to one of predetermined positions corresponding to said modes, a control lever pivotally mounted on the baseplate, a drive source, a relay wheel rotatably mounted on the control lever and including a rotary shaft, the relay wheel being connected with the drive source for rotation, and means for controlling the control lever in a manner such that when the operation lever is moved to either record or playback position, the rotary shaft carried by the control lever becomes effective to drive the take-up shaft for rotation in a given direction, when the operation lever is moved to a rewind position, the relay wheel becomes effective to drive the rewind shaft for rotation in the opposite direction from the given direction, and when the operation lever is moved to a stop position, neither the rotary shaft nor the relay wheel is effective to drive the take-up and the rewind shaft, respectively said means for controlling the control lever comprising a notch cam formed on the operating lever, a pin on the control lever engaging the notch cam, and a spring normally urging the control lever in a direction to cause the relay wheel to be operatively connected with the take-up shaft, the notch cam cooperating with the spring to control the position of the control lever through the pin.

6. A cassette tape recorder according to claim 5 in which the transducer head is fixedly mounted within the housing while the erase head is supported for angular movement within the housing, the erase head being moved as the operation lever is operated such that it operatively contacts a tape in the cassette in the record position of the operation lever and is moved away from the tape in the rewind position of the operation lever.

7. A cassette tape recorder according to claim 5 in which the erase head has a curved front face formed by an insulating material and internally houses a magnet which has its end face exposed at an offset position of the front face, and further including spring means for resiliently urging the erase head to a neutral position in which the front face remote from the magnet bears against the tape in the stop and playback positions of the operation lever when the tape cassette is received into the housing, first means for driving the erase head against the spring means to an operative position in which the magnet bears against the tape in response to a movement of the operation lever to the record position, and second means for driving the erase head against the spring means to an inoperative position in which it is moved away from the tape in response to a movement of the operation lever to the rewind position.

8. A cassette tape recorder according to claim 7 in which the first and second means are arms extending from the operation lever.

9. A cassette tape recorder according to claim 7 in which the neutral position is located intermediate the operative and the inoperative position.

* * * * *